United States Patent
Payton et al.

(10) Patent No.: US 6,507,771 B2
(45) Date of Patent: Jan. 14, 2003

(54) METHOD AND APPARATUS FOR CONTROLLING THE MOVEMENT OF A PLURALITY OF AGENTS

(75) Inventors: David W. Payton, Woodland Hills, CA (US); Mike Howard, Westlake Village, CA (US); Mike Daily, Thousand Oaks, CA (US); Craig Lee, Redondo Beach, CA (US); Bruce Hoff, Venice, CA (US)

(73) Assignee: HRL Laboratories, Malibu, CA (US)

( * ) Notice: Subject to any disclaimer, the term of this patent is extended or adjusted under 35 U.S.C. 154(b) by 0 days.

(21) Appl. No.: 09/903,879

(22) Filed: Jul. 10, 2001

(65) Prior Publication Data

US 2002/0138179 A1 Sep. 26, 2002

Related U.S. Application Data

(60) Provisional application No. 60/217,232, filed on Jul. 10, 2000, and provisional application No. 60/217,226, filed on Jul. 10, 2000.

(51) Int. Cl.$^7$ .............................................. G06F 19/00
(52) U.S. Cl. ..................... 700/245; 700/246; 700/247; 700/248; 700/249; 700/250; 700/251; 700/252; 700/258; 700/259; 700/260; 700/261; 700/264; 701/23; 701/24; 701/25; 701/26; 701/200; 701/207; 701/213; 701/217; 701/220; 318/568.1; 318/568.11; 318/568.22; 901/1
(58) Field of Search ................................. 700/245, 250, 700/258, 259, 249, 252, 260, 261, 254, 264, 246–248, 251; 701/200, 207, 213, 217, 220, 28, 23–26; 318/568.1, 568.11, 568.22; 901/1, 9, 15, 46, 47

(56) References Cited

U.S. PATENT DOCUMENTS 4,028,533 A 6/1977 Matsubara (List continued on next page.)

FOREIGN PATENT DOCUMENTS

WO    WO 02/08843 A3 * 10/2001

OTHER PUBLICATIONS

Howard et al., Fast Visual Mapping for Mobile Robot Navigation, 1997, IEEE, pp. 1251–1255.*

(List continued on next page.)

*Primary Examiner*—William A. Cuchlinski, Jr.
*Assistant Examiner*—McDieunel Marc
(74) *Attorney, Agent, or Firm*—Tope-McKay & Associates

(57) ABSTRACT

A method for controlling the movement of agents using local communications is provided. Generally, each agent maintains an optimal distance from other local neighbor agents by, for each agent 200, selecting a local agent 202, measuring the distance and angle to the agent 204, performing a distance maintenance calculation 218, and repeating the distance maintenance calculation 218 for each local agent. In the distance maintenance calculation 218, an attraction/repulsion map is used in order to determine whether an agent is attracted to or repelled from other agents. A motion vector is used to determine agent responses to the attraction or repulsion. Over time, the agents settle into a neutral configuration where each is optimally distanced from the other agents. Reference agents and leader agents can be designated to direct the movement of other agents, and agents can be designated as blocking beacons to repel other agents from undesirable areas.

48 Claims, 9 Drawing Sheets

U.S. PATENT DOCUMENTS

| | | | |
|---|---|---|---|
| 5,233,604 A | | 8/1993 | Ahmadi et al. |
| 5,561,790 A | | 10/1996 | Fusaro |
| 5,675,741 A | | 10/1997 | Aggarwal et al. |
| 5,946,083 A | | 8/1999 | Melendez et al. |
| 5,991,300 A | | 11/1999 | Tappan |
| 6,154,139 A | | 11/2000 | Heller |
| 6,195,020 B1 | | 2/2001 | Brodeur, Sr. et al. |
| 6,208,247 B1 | | 3/2001 | Agre et al. |
| 6,311,129 B1 | | 10/2001 | Lin |
| 6,330,493 B1 | * | 12/2001 | Takahashi et al. .......... 700/258 |
| 6,341,246 B1 | * | 1/2002 | Gerstenberger et al. .... 700/245 |
| 6,374,155 B1 | * | 4/2002 | Wallach et al. ............. 700/245 |
| 6,408,226 B1 | * | 6/2002 | Byrne et al. ................ 700/245 |

OTHER PUBLICATIONS

Rybski et al., Effects of limited Band width Communications Channels on the Control of Multiple Robots, 2001, IEEE, pp. 369–374.*

D. W. Gage, "Command and Control for Many–Robot Systems", In the Nineteenth Annual AUVS Technical Symposium (AUVS–91), Huntsville, AL, Jun. 22–24, 1992, Reprinted in Unmanned Systems Magazine, 10(4):28–34, Fall 1992.

D. W. Gage, "Many Robot Systems", SPAWAR web page, http://www.nosc.mil.robots/research/manyrobo/many-robo.html.

* cited by examiner

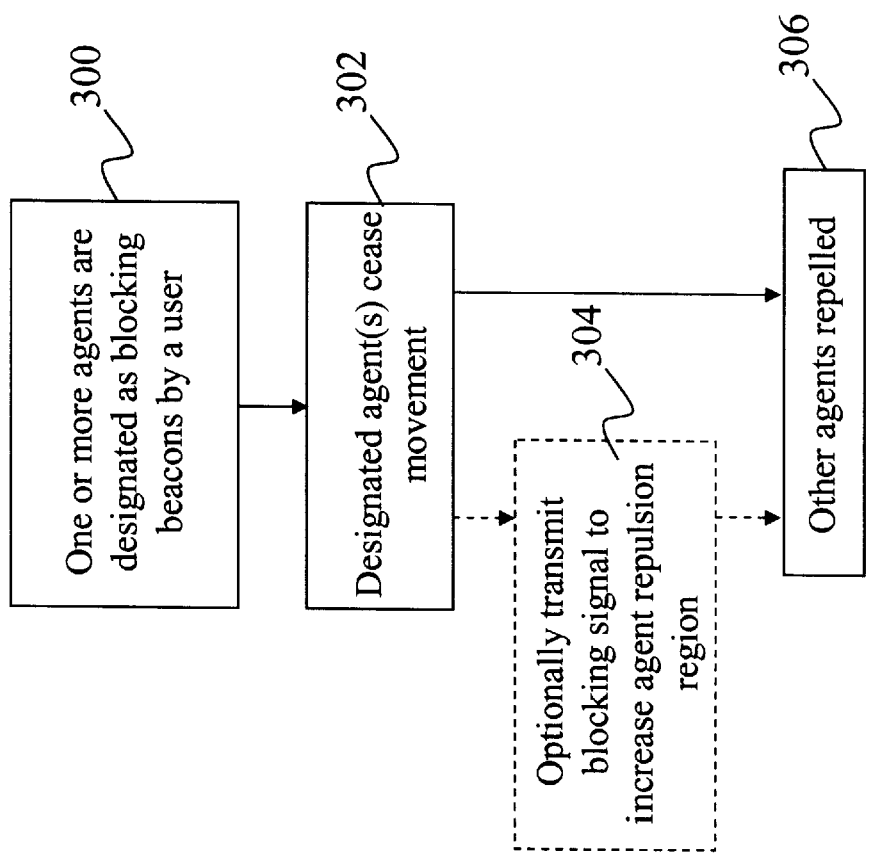

METHOD AND APPARATUS FOR CONTROLLING THE MOVEMENT OF A PLURALITY OF AGENTS

PRIORITY CLAIM

This application claims the benefit of priority to provisional applications number 60/217,232, filed in the United States on Jul. 10, 2000, and titled "Emergent Movement Control for Large Groups of Robots" and 60/217,226, filed in the United States on Jul. 10, 2000, and titled "Terrain Reasoning with Distributed Embedded Processing Elements".

STATEMENT OF GOVERNMENT RIGHTS

This invention is related to work performed in contract with the U.S. Government under DARPA ITO Contract #N66001-99-C-8514, "Pheromone Robotics", and the U.S. Government may have certain rights in this invention.

TECHNICAL FIELD

The present invention is related to the field of controlling movement for large groups of agents. More specifically, this disclosure presents a method for controlling the movement of a plurality of agents using local, low bandwidth communications.

BACKGROUND

Over the past few decades, approaches to controlling agents have focused on individual agents and a centralized database. As a result, traditional control of agents and sensors has taken the form of a single mobile agent or a small number of agents using a pre-constructed digital map to aid in path planning and control of the agents or agents. It was necessary to develop a large centralized terrain/environment database to serve as the preconstructed digital map for geometric computations. Typical computations at these centralized databases include determination of shortest path to destination, and routes to destinations. Information relevant to these approaches can be found in U.S. Pat. Nos. 4,119,900; 4,882,694; 5,165,064; and 5,170,351. However, the agent control systems disclosed in each one of these references suffers from one or more of the following disadvantages: 1) the agent is oriented within a fixed surface area; 2) the system only allows for narrow applications of distance-maintenance; 3) the system requires a master station and a means to locate agent; 4) the system requires cameras to locate the mobile agents; 5) the employment of an array of ultrasonic transducers is required on mobile agents; 6) each agent is individually controlled and monitored by a large master station database; and 7) each agent monitors a sector of workspace. Thus, it is desirable to provide a method and apparatus for overcoming these limitations.

SUMMARY OF THE PRESENT INVENTION

The present invention provides a method and apparatus for controlling the movement of a plurality of agents. Specifically, the present invention provides the control mechanism through the use of a signaling mechanism wherein certain criteria of a signal, either explicit (such as information embedded in a signal) or implicit (such as an inherent property of the signal like the transmission power) in order to set up ranges of attraction and repulsion in order to maintain a predetermined distance between the agents.

The present invention provides a method for controlling the movement of a plurality of agents wherein each of one of the plurality of agents has at least one other agent locally spaced at a distance therefrom. Each one of the plurality of agents comprises a means for providing mobility, a means for detecting distance and direction to the at least one other locally spaced agent, and a processor coupled with the means for providing mobility and with the means for detecting distance and direction in order to control the movement of the agent and to process the distances and directions between the agent and the at least one other locally spaced agent.

In one embodiment, the method comprises the steps of determining the distance and direction of each agent from each other agent locally spaced with respect thereto; processing the distances and directions between the agent and each other locally spaced agent; and using a distance-maintenance movement behavior based on the distances and directions between the agent and each other locally spaced agent to maintain a predetermined distance from each other locally spaced agent.

In addition to the above, the method may further comprise the steps of designating one of the plurality of agents to act as a blocking beacon; preventing movement of the agent designated to act as a blocking beacon; and urging agents locally spaced with respect to the agent designated to act as a blocking beacon to move away from it, whereby the agent designated as a blocking beacon acts to repel other agents from its vicinity.

The step of processing the distances between the agent and each other locally spaced agent may be performed by providing an attraction/repulsion map for each agent, including an attraction region and a repulsion region; for each other locally spaced agent, determining, based on the attraction/repulsion map, whether the agent is in the attraction region or the repulsion region with respect to the other locally spaced agent; for each other locally spaced agent, where the agent is in the attraction region of a locally spaced agent, generating a vector representing attraction of the agent toward the locally spaced agent; for each other locally spaced agent, where the agent is in the repulsion region, generating a vector representing the repulsion of the agent from the locally spaced agent; using all of the vectors developed for all of the locally spaced agents to generate a movement vector; and wherein the movement vector is used provide a heading and velocity for the agent in order to perform the step of using a distance-maintenance movement behavior to maintain a predetermined distance from the agent to each other locally spaced agent, thereby providing a distance maintenance movement behavior.

Additionally, the step of processing the distances between the agent and each other locally spaced agent may further include the steps of providing a neutral region to the attraction/repulsion map for each agent; and for each locally spaced agent, where the agent is in the neutral region of a locally spaced agent, generating a vector representing neutrality toward the locally spaced agent.

In a further step, the attraction, repulsion, and neutral region may be configured as generally concentric rings around an agent, with the repulsion region residing closest to the agent, the attraction region residing furthest from the agent, and the neutral region residing between the repulsion region and the attraction region. This aids in causing each one of the plurality of agents to maintain a predetermined distance from each other agent locally spaced therefrom. The regions may be defined as functions that decrease in a particular direction. For example, in the attraction region, the attraction may be tailored such that it becomes stronger with increasing distance, while in the repulsion region, the repulsion may be tailored such that it becomes weaker with increasing distance.

Among the agents, one may be designated as a leader, and the attraction/repulsion map for the leader may be adjusted so that the leader moves further away from the locally spaced agents with the locally spaced agents urged toward the leader, whereby the leader moves away from the other agents and the other agents follow the leader.

The designation of the leader may be triggered by various events such as, for example, when the number of agents provided is insufficient to fill the area while maintaining the predetermined distance from each other. The designation of the leader may also be triggered explicitly by a user command.

The leader designation is defined as what starts the actual process of selecting a leader. The actual selection of a leader may be performed in many ways, a few examples of which include (a) selecting the leader explicitly by a user command, (b) selecting a leader through a random selection process, (c) selecting a leader through a repeated random selection process, and (d) selecting the leader through a biased random selection. The process of selecting a leader may be periodically repeated upon the occurrence of a triggering event. Additionally, once a leader is selected, it may be desirable for the leader to transmit a suppression signal for preventing the repetition of the leader designating step until the occurrence of a triggering event. The suppression signal may be such that it indicates the approximate distance from the leader and such that upon cessation of the transmission of the suppression signal, the random selection process is caused to resume, but is biased in favor of those agents furthest from the leader. In addition, the suppression signal transmitted from the leader may be relayed away from the leader such that it indicates the approximate distance from the leader and is ineffective for preventing the repetition of the leader designating step at a sufficient distance.

In another embodiment, at least one agent may be designated as a reference agent, transmitting a unique reference signal that is relayed through the plurality of agents in such a way as to provide a distance estimate from the respective reference agent, wherein at least a portion of the other agents respond to the at least one reference signal by moving in a manner determined as a function of the distance estimates of the reference signals. In this way, the agents may be controlled by reference agents to follow a particular path or align in a particular pattern. For example, if two reference agents are used, the other agents may be caused to align in a line equidistant from the reference agents. If three agents are used as references, the other agents may be controlled by using a triangulation-type method.

All of the functions necessary to perform the steps of the method may be incorporated into the circuitry of the agents, in the form of software or hardware. Individual agents or groups of agents may be produced embodying the necessary hardware to accomplish the method.

BRIEF DESCRIPTION OF THE DRAWINGS

These and other features, aspects, and advantages of the present invention will become better understood with regard to the following description, appended claims, and accompanying drawings wherein:

FIG. 3 is a flow diagram depicting steps in a method for designating blocking agents in order to block the movement of other agents through the vicinity of the blocking agent;

DETAILED DESCRIPTION

Figure 1:
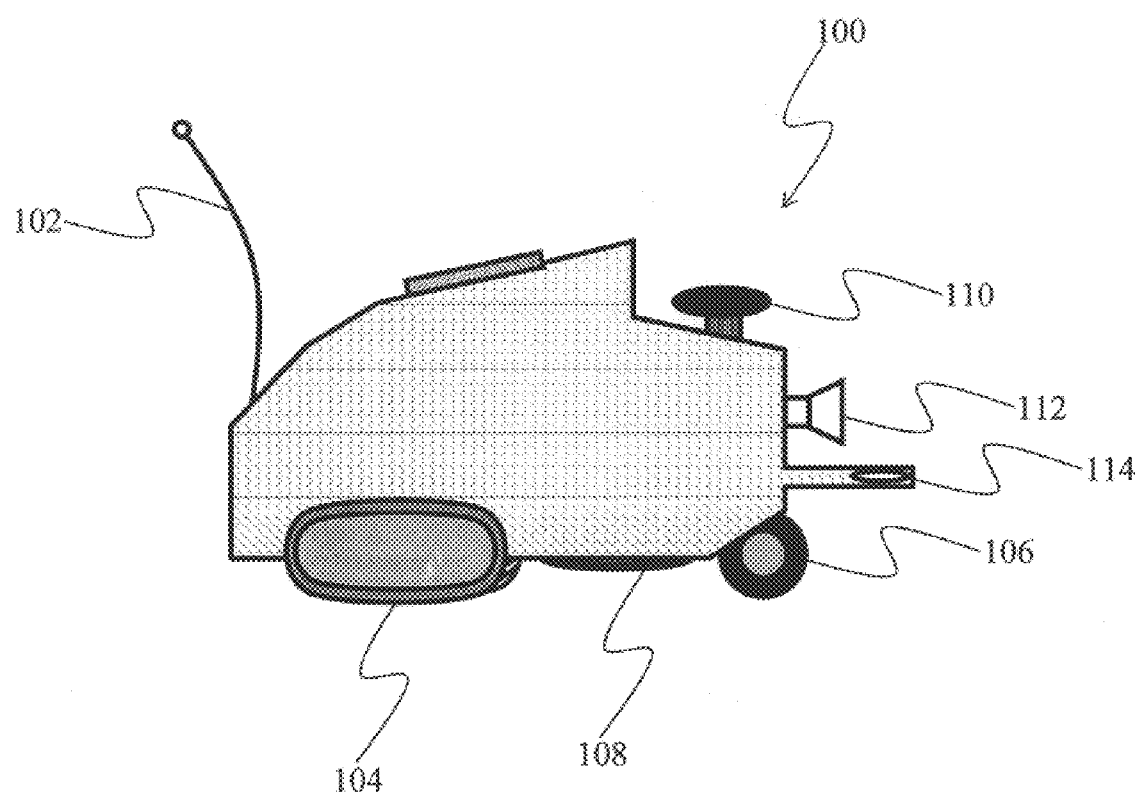
FIG. 1 is an illustration of an example of a typical agent used in conjunction with the present invention.

The present invention relates to the field of controlling movement for large groups of agents. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In order to provide a working frame of reference, first a glossary of terms used in the description and claims is given as a central resource for the reader. Next, a brief introduction is provided in the form of a narrative description of the present invention to give a conceptual understanding prior to developing the specific details.

Glossary

Before describing the specific details of the present invention, it is useful to provide a centralized location in which various terms used herein and in the claims.

Agent—As described herein, the term agent indicates a unit comprising, in its most general sense, a processor, a means for detecting distance and direction, and a memory. The agent can also include one or more means for movement and one or more sensors. In more tangible terms, the agent could, for example, be a robot with an infrared transmitter/receiver and a set of wheels, where the infrared transmitter/receiver is used to gage the distances and directions between the robot and other robots. In a more complicated situation, the same robot could also include an antenna for sending and receiving radio communications, a group of sensors for sensing various aspects of the environment (such as temperature, visibility, etc.), and alternate movement means such as wings and a propeller for flying, etc.

Attraction/repulsion map—The attraction/repulsion map generally defines a field of points represented by combinations of distance and direction from an agent. Each point may define a different action for an agent at the point. Actions include, but are not limited to attraction toward or repulsion from another agent. In the preferred embodiment, the attraction/repulsion map includes three distinct regions formed as concentric rings. The inner ring acts as a repulsion field to repel the agent from other agents that enter the repulsion field, the outer ring acts as an attraction field to attract the agent to other agents in the attraction field, and the middle ring acts as a neutral field. Configured in this manner, the agent settles at a distance that minimizes the attractive and repulsive forces it feels. It tries to move so that every local agent is located in the neutral ring. In this version, the attraction/repulsion map may be tailored to provide attraction and repulsion as a function of distance from the agent it surrounds (e.g., attraction becoming stronger further from the agent and repulsion becoming stronger closer to the agent). The attraction/repulsion map is used in the overall distance maintenance behavior to generate movements in the agents that ensure they maintain proper spacing from each other. Note that the attraction/repulsion map may be varied in real-time either by a user or by another triggering event in order to provide different levels of agent dispersion. The attraction/repulsion map can be keyed to different systems on board the agent.

Local—The distance maintenance behavior used in the present invention utilizes a means for determining directions and distances between agents. As it is desirable to maintain a predetermined spacing between the agents, the attraction and repulsion of other agents is generally operated over a local area. Specifically, agents within the attraction/repulsion region (or map) of other agents are considered to be local and are termed neighbors. As a plurality of agents expands to fill an area, the agents are caused to move by a resultant movement vector produced by the attraction and repulsion between the agents. The number of local (neighbor) agents to a given agent may vary depending on the number of agents present in a given area (e.g., the spacing of the agents may be compressed if the area which they occupy is less than the area they would occupy without the presence of boundaries). It is desirable to use signaling only between local agents to conserve transmission power.

Low-bandwidth communication—The present invention is designed to provide a simple signaling mechanism for maintaining a predetermined distance between agents. The term low-bandwidth as used herein is synonymous with the use of low bit-rate communications. The present invention requires that agents, at a minimum, have low-bandwidth communications, but low bandwidth is not required.

Means for detecting distance and direction—In order to facilitate the movement of agents such that they reside a predetermined distance from each other, they must have a mechanism for determining the distance and direction to other agents. The means for detecting distance and direction can take many forms, examples of which include range and direction finders utilizing infrared, sonar, radar, or lasers. The means for detecting distance and direction may also be provided by having the agents transmit a signal with a predetermined amount of power, and using the other agents as receivers, analyzing the signal to determine signal strength, and using the signal strength as a measure of distance. However, the latter method of determining the distance and direction to other agents has a drawback in that other environmental conditions may affect the transmission of the signal, resulting in an undesirable spacing between agents.

Means for providing mobility—In order to move in response to attraction and repulsion, the agents need something to facilitate that movement. Any known and controllable movement mechanism may be used, as suitable for the environment in which the agent is used. For example, on land, an agent would typically have legs or wheels, whereas in the air, an agent might have a propeller and wings. On the other hand, in liquid environments, the agent would be equipped with a propeller and fins, where in space, the agent would be equipped with jets or rockets. The means for providing mobility is coupled with, and controlled by, the processor.

Sensors—In addition to the means for means for detecting distance and direction from other agents, the agents may be equipped with sensors coupled with their processors for collecting information regarding their environment as well as regarding the status of the agent. Non-limiting examples of sensors that may be used with the agents of the present invention include smoke detectors, sound detectors, heat/infrared detectors, chemical sensing devices, and weather sensors. These sensors may be used to provide behavior-triggering events such as used by the mechanism for determining a leader agent in order to direct the movement of other agents.

Introduction

The present invention is useful for controlling the movement of a plurality of agents using only local, low bandwidth signals. Objects of the present invention include providing a system that offers: 1) a simple operation for communication, coordination, and control of multiple agents or agents; 2) minimal on-board processing and little or no memory within multiple agents or agents; 3) coordination of a large number of agents based on only local communications; 4) an ability to populate an area with a multitude of agents or agents rather than, using a single agent or agent to navigate and report; 5) distance information that can be relayed along with direction information so the shortest path to a feature can be determined; and 6) redundancy or fault tolerance, so that if a few agents or agents fail or are destroyed others will fill in the gaps and maintain coverage.

The present invention provides a plurality of agents, wherein each agent has a means for determining the distance and angle to other local agents. Preferably, signals are used for this purpose, and an attraction/repulsion map is used in a distance maintenance behavior, whereby the agents act in response to the attraction/repulsion map in order to move toward or away from other agents, and settle into an area between attraction and repulsion at a predetermined distance from each other. By varying the attraction/repulsion map, different agent behaviors may be generated. For example, an agent could be set to always be repelled by other agents. As the agent is repelled, increasing its distance from the other agents, the attraction behavior of the other agents causes them to attempt to follow. Thus, in essence, a leader for the group is generated. Group leaders may be determined by several means, either explicitly or implicitly. For example, if the group encounters an obstacle and can no longer move in a given direction, it may be desirable to appoint a leader far from the object in order to attract the group away from the obstacle.

Agents may also be specifically appointed to transmit control signals that are distinct from any signals used in conjunction with the attraction/repulsion map. The distance and direction of the controlled agents are be determined by processing the control signals. At the same time, agent spacing is maintained via the attraction/repulsion map. Depending on the number of dimensions in the environment of operation and the desired type of control, different numbers of appointed agents are required to control the other agents. The approach is similar to triangulation techniques.

Specifics of the Present Invention

As illustratively depicted in FIG. 1, agents 100 used with the present invention typically take the form of small robots having a communication capability 102, a mobility means such as a set of tracks 104, a set of wheels 106, or wings, propellers, etc. (not shown), depending on the needs of the particular environment (e.g., agents for use in liquid mediums such as water would use propellers and fins to move). The mobility means is connected with a processor, which controls the mobility means. The processor, in turn, is connected with a memory, and may take the form of a specific purpose processor, or may be a general purpose processor utilizing software for controlling the various functions of the agent. The agents may be equipped with a means for measuring the distance and direction from any other local agent. The means may take any useful form known in the art. For example, actively transmitting a signal and then sensing when it bounces off other objects, as in sonar or laser range finding. Alternatively, any passive means of detecting radiations from objects, such as heat, may be used. In one embodiment, each agent may send periodic omni directional signals via infrared transmitters, and the other agents sense the signals using infrared receivers, estimating the distance by the loss of signal strength.

Below, the various activities performed by the agents are described. The activities are typically implemented by use of software in conjunction with the memory and processor in the agents. Optionally, the operations may also be encoded in hardware, rather than software. As shown, the agent 100 includes various other sensors, such as a metal detector 108, an infrared transmitter/receiver or rangefinder 110, a video camera 112, and a gas chromatograph 114. These or other sensors may be incorporated into the agent and connected with the processor in order to provide useful data, for use, for example, in designating blocking beacons (described further herein).

Figures 2A, 2B:
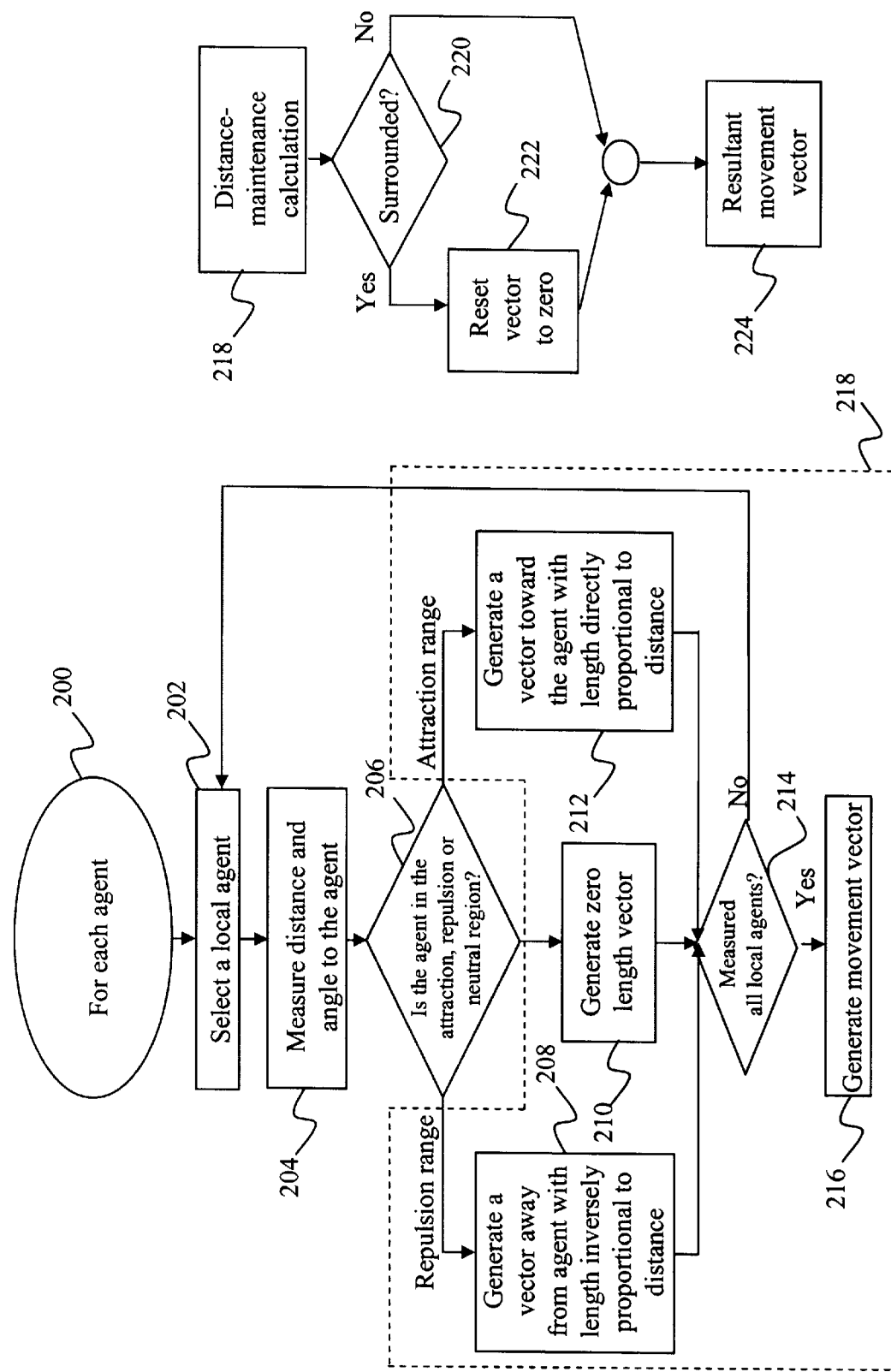
FIG. 2 is a flow diagram depicting steps in a general method for generating a movement vector to implement a distance-maintenance behavior.

Flow diagrams depicting the steps in various behaviors used in conjunction with the agents of the present invention are provided in FIG. 2. A flow diagram depicting the steps in an embodiment of the method of the present invention is depicted in FIG. 2a. The method is continually run for a plurality of agents (and, depending on the particular embodiment, the agents may include the ability to detect objects as well as other agents). For each agent or obstacle that can be detected 200, an agent (or object) is selected 202. The distance and angle to the agent (or object) is measured in a distance and direction measuring step 204. Next, the distance is processed to determine whether the agent is in an attraction region, a repulsion region, or a neutral region in a distance and direction processing step 206. Note that depending on the embodiment, the attraction region and the repulsion region may take different forms, and the neutral region may or may not be present. The attraction/repulsion region is generally defined as an attraction/repulsion map, which may take any arbitrary shape having a plurality of points, each corresponding to a distance and angle. However, the preferred form of the attraction/repulsion map is a series of three concentric rings, the closest to the agent representing a repulsion region, the furthest representing an attraction region, and the middle representing a neutral region. Depending on whether the agent is in a repulsion region, a neutral region, or an attraction region, in the next step, a repulsion vector may be generated 208, a neutral vector may be generated 210, or an attraction vector may be generated 212. Attraction/repulsion map may be defined such that if it is used in generating the attraction or repulsion vector, it creates a greater level of attraction or repulsion for some areas of the attraction/repulsion map than for others. For example, the level of attraction and repulsion may be determined as a function of distance from the agent, with the attraction increasing with greater distance from the agent and the repulsion increasing with decreased distance from the agent.

Next, it is determined whether the distance and angle of all of the local agents has been measured 214. If not, then the process repeats itself. Once the distance and angle of all of all of the local agents has been measured, all of the attraction vectors and repulsion vectors are utilized to generate a movement vector 216. Although other known methods may be used, the simplest way of generating the movement vector from the attraction and repulsion vectors is through a simple summing operation to provide a resultant vector.

Next, the agents move according to the vectors. By continually regenerating the movement vectors, the agents maintain a predetermined distance from one another. Note that it is also possible to provide the agents with a means for adjusting the attraction/repulsion maps so as to cause the area covered by a plurality of agents to expand or contract.

Depending on the configuration of the attraction/repulsion map, agents may oscillate back and forth between attraction and repulsion. The method may be augmented to reduce this fidgeting in the manner shown in FIG. 2b. A distance maintenance movement behavior 218, as depicted in FIG. 2b, represents steps 208, 210, 212, 214, and 216 from FIG. 2a. However, in conjunction with the distance maintenance movement behavior 218, the agents check to determine whether they are surrounded locally by other agents 220. If an agent is surrounded, the movement vector is reset to zero 222 or reduced substantially so that the agent behaves neutrally. If the agent is not surrounded, then the movement vector is utilized for agent movement. The resultant movement vector is then developed 224. This method can reduce jitter caused by agent competition for equilibrium among the attraction/repulsion maps of several local agents.

Distance Maintenance Behavior Mechanisms

The distance maintenance behavior of the agents may be facilitated through the use of a sensor system that allows the determination of the direction and distance from one agent at a time. For example, a circular array of distance-measuring sensors (such as infrared) sensors may be employed on each agent, such that each sensor has an angularly limited receptive field, permitting only one agent at a time to be sensed.

The agents may also transmit signals for receipt by other agents. The distance between agents may then be estimated from the signal strength of the transmission, where the signal strength diminishes over the distance. Since the intensity varies in inverse-squared proportion to the distance from the originating source, an intensity value can be used to determine the distance. Therefore, the distance-maintenance behavior control distance may be estimated from the signal strength in interactions between local agents where the signal strength diminishes over the distance.

Blocking Beacons and Gas Expansion

In some circumstances, it may be desirable to provide a blocking mechanism to prevent agents from entering a particular area. This concept may be likened to that of using a buoy to warn ships of danger. General steps of using an agent as a blocking beacon are depicted in FIG. 3. In the embodiment depicted, first a user of the plurality of agents designates one or more agents to serve as blocking beacons by some means of communication 300. The designation may occur by such means as laser pointing, radio signaling, infrared signaling, or any other available signaling mechanism. Note that, although depicted as a user triggered event, agent blocking may also occur in response to various events. For example, if an agent is equipped with sensors for determining information about the environment in which it is dispersed, it may be able to automatically warn other agents of danger. As a more specific example, an agent may be designed to act as a blocking beacon upon being damaged in order to prevent other agents from suffering the same fate.

After being designated, the agent stops calculating movements and stays still 302. The agent may then transmit an explicit blocking signal 304, urging other agents away from its location. If the agent is not equipped to transmit an explicit blocking signal, other agents will still stay away from the location of the agent due to their repulsion regions 306.

There are several general types of movement possible through the use of the present invention. In the simplest case, the group of agents simply expands until they fill an area, with each agent residing equidistant to one or more neighboring agents. This movement pattern is analogous to the expansion of a gas to fill a volume, except that the agents are designed to maintain a predetermined distance from each other. Thus, unlike the case of a gas, the agents stop expanding. The use of blocking agents can shape this gas-type expansion behavior by acting to pin down the other agents via maintaining them a predetermined distance from each other while halting the motion of one. In some cases, it may be desirable to turn off a blocking agent's association (in terms of repulsion) with the other agents and let it serve simply as a barrier, rather than something that would halt the motion of the overall group.

Guided Growth

Another general type of agent movement is guided growth, wherein one or more agents may be designated as leaders. Typically, the attraction/repulsion map of the leaders will be modified by strengthening the leader's repulsion from other agents, or increasing the area of its repulsion map. As a result, the leader will tend to move away from the other agents, and the other agents will follow the leader due to their attraction.

There are two distinct steps for generating a leader. First is the event that triggers the leader selection process, and second is the process of selecting the specific agent to serve as the leader. Numerous methods can be used for each. For example, the leader selection process may be triggered explicitly by a user command via a remote control or other input device. The leader selection process may also be triggered implicitly upon the occurrence of a certain event. The triggering event which begins the leader selection process may be tailored to the needs of a particular embodiment. Examples of useful implicit triggering events include triggering the selection of a new leader when the current leader is in a place where it can no longer move, when the current leader becomes damaged or, when another agent (equipped with additional sensors) detects a feature of the environment that makes it more desirable as a leader than the current leader (e.g., a group of agents searching for a fire, wherein a non-leader agent detects smoke—it may be desirable to have the smoke-detecting agent become a leader).

The actual selection of a leader is distinct from the triggering event that causes the selection of a new leader. The agent may be explicitly selected by the user. Alternatively, the leader may be randomly selected by a process similar to drawing straws, wherein each agent generates a random number and communicates the random number with the other agents. The agent with the highest random number (or lowest) becomes the new leader. Depending on the number of agents, and the degree of numerical precision available, it may be necessary to run a random selection process multiple times to narrow down the field of possible leaders.

It is often desirable to have a new leader selected from a portion of the agents physically remote from the current leader. Therefore, the random selection process may be weighted against agents close to the leader. Since communication between agents takes place locally between immediate neighbors, with communications relayed to agents further away, it is possible to determine the number of communication hops between a particular agent and the leader. The number of hops can be factored into the random selection process in order to bias the process in favor of agents distant from the current leader. Other factors may be used for biasing the random selection process. For example, if the agents have other sensors, information from the other sensors may be used to augment the random selection process. For example, referring back to the smoke detection case, the random selection process can be weighted by the amount of smoke detected by an agent in order to favor those agents more likely to be near a fire. In some cases, such as where the feedback from other sensors is very strong, the random selection process may be eliminated in favor of a simple determination of a leader based on the strength of the sensor readings.

In some embodiments, especially with the use of sensors to detect physical attributes of the environment, an ongoing competition process may be used, in which agents periodically communicate the status of their sensors. In many cases, particularly when several agents are near an item sought, leadership may oscillate from agent to agent.

Therefore, it may be desirable in these cases for the current leader to send a suppression signal in order to prevent leadership changes and to minimize frequent localized leadership changes. On the other hand, the random selection process could also include a mechanism for favoring the current leader. For example, if the random selection process generates numbers between one and ten, the current leader can have a few bonus points during every random selection round in order to provide a measure of favoritism. The same technique could be used in conjunction with the hop count to favor agents further from the current leader when the current leader becomes stuck and triggers the selection process.

If a suppression signal is used, it may be implemented in a number of ways. For example, if the leader is equipped with a power transmitter that can reach all agents at once, then it can transmit the message periodically using that transmitter. On the other hand, the message can be passed from one agent to the next. This can be done by passing the message from local neighbor to local neighbor, using established routing methods, commonly available in the literature. If the message is retransmitted by the leader periodically at a rate that exceeds the rate at which agents clear their memory, the suppression signal can achieve its desired effect. When the leader ceases transmission of the suppression signal, the closest neighbors will flush the message from their memories first, followed by their neighbors. This means that it is more likely for agents closest to the leader to stop being suppressed first.

It is worth noting that in some cases, it may be desirable to allow for the coexistence of multiple leaders. This may be the case in circumstances such as where the agents are searching for an object. If more than one agent in distinct locations detect clues of the object, it may be desirable to appoint multiple leaders. The leaders could then have a short-term competition until the best one is determined (perhaps via the continued strength of a signal from an on-board sensor). At that point, the less-favorable leaders give up their roles and assume the role of ordinary agents.

Until the competition is finished, the competing leaders may project a suppression signal to the non-leader agents to prevent the other agents from becoming leaders.

Figure 4:
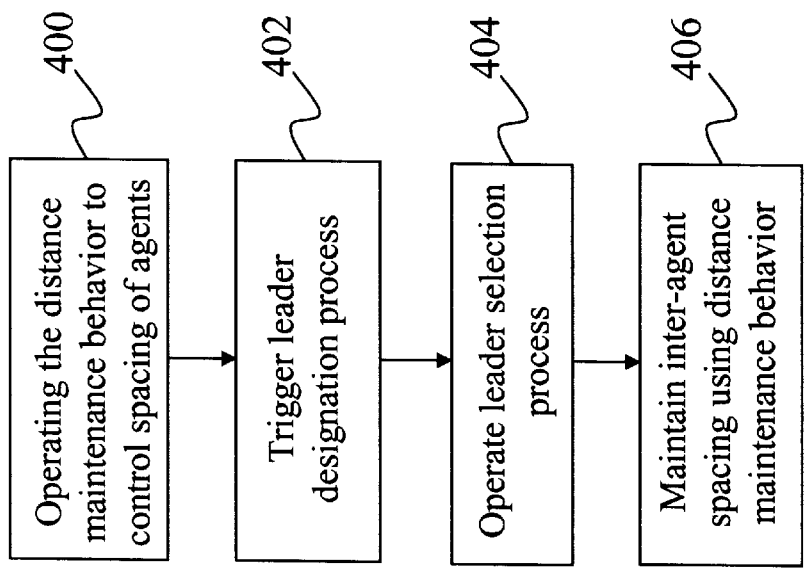
FIG. 4 is a flow diagram depicting steps in a transition between two different ways of agent coordination.

FIG. 4 provides a simple flow diagram depicting a transition from a gas expansion-like behavior to a leader-guided behavior. Initially, a distance-maintenance behavior is used to control the distance between the agents and to provide for a gas expansion-type movement, as depicted by box 400. Next, the leader designation process is triggered as depicted by box 402. The leader designation process may be triggered explicitly or implicitly. Following the initiation of the leader designation process, a leader is selected as shown by box 404. After the leader is selected, typically, the leader will begin to move the group of agents, while inter-agent spacing is maintained by using the distance maintenance behavior, as shown by box 406. Note that box 406 represents essentially the same operation as box 400.

Reference Agent Controlled Movement

Figure 5:
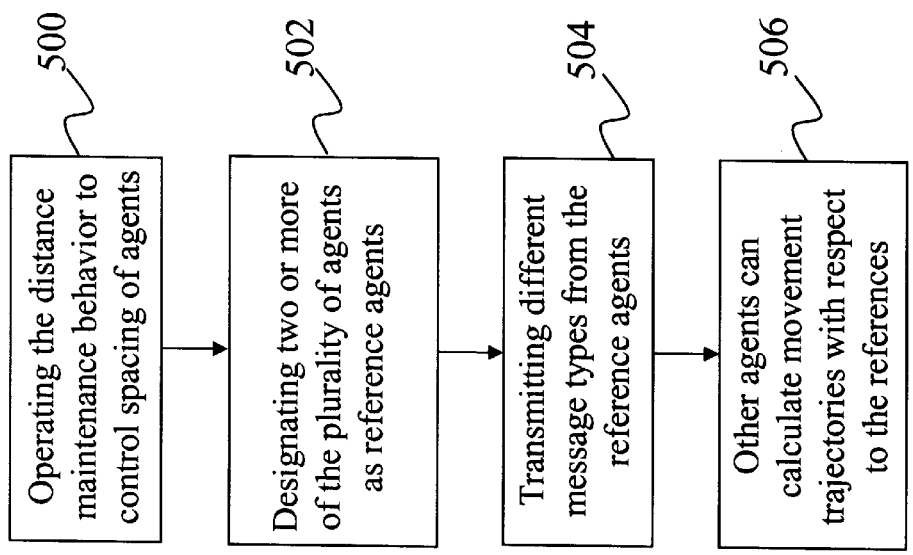
FIG. 5 is a flow diagram depicting steps in a method for controlling agents using two agents as reference agents.

In addition to leader-controlled movement, one or more agents may be designated as reference agents in order to control the movement of other agents. A simple flow diagram is depicted in FIG. 5, showing the general steps in utilizing reference agents to guide other agents. First, it is assumed that the agents utilize a distance-maintenance behavior to control their movement, as depicted by box 500. Note that the functionality of box 500 is identical to that of boxes 400 and 406 from FIG. 4. Next at least one, or as depicted in the diagram, two, agents are designated as reference agents, as shown by box 502. Preferably each reference agent transmits a different signal from that of the other references, and agents different from that used for the distance maintenance behavior, as depicted by box 504. The number of reference agents designated directly impacts the degree of control available over other agents. For example, with one reference agent, it is possible to generate a circle of agents. With two reference agents, it is possible to create a line of agents equidistant from the two reference agents, or given a known distance between the reference agents, it is possible to control the motion of agents in a two dimensional plane. If three reference agents are provided, the same may be accomplished. With four reference agents, motion in a three dimensional space may be controlled. Once the reference agents are designated and transmitting, the other agents can calculate movement and trajectories with respect to the reference agents, as shown by box 506. Note that depending on the particular embodiment, the reference signals transmitted by the reference agents may be transmitted over the group of agents via a more powerful transmitter or by transmitting the signal from the a reference agent to local neighbors, and retransmitting the signal from the local neighbors to their local neighbors (e.g., hopping the signal across the plurality of agents). Hopping the signal across the plurality of agents essentially generates a signal wavefront from which the approximate distance and direction of a controlled agent can be determined from the reference agents. Note that with the hopping technique, generally the closer the controlled agent is to the reference agents, the greater the possible positioning error.

Now that the actions of the plurality of agents has been explained, several illustrations graphically depicting aspects of the agents in relation to other agents will be presented in order to more clearly describe the operation of the present invention.

Operative Illustrations

Figure 6:
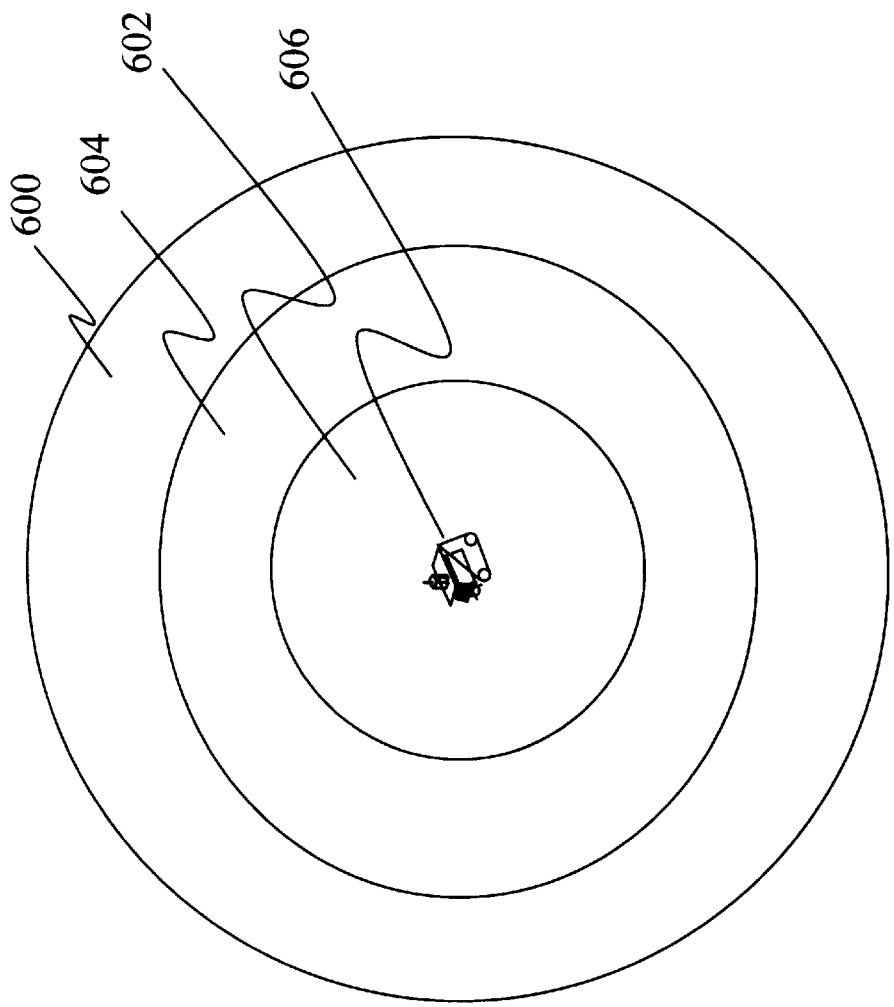
FIG. 6 is an illustrative diagram depicting an agent with an attraction/repulsion map having three distance zones with distance, providing a basis for agent attraction and repulsion.

An illustrative diagram depicting a simple attraction/ repulsion map including an attraction region 600, a repulsion region 602, and a neutral region 604 is shown in FIG. 6. As previously mentioned, many other configurations of the attraction/repulsion map may be defined. The agent 606 resides at the center of the attraction/repulsion map. The actual generation of the attraction/repulsion map may be provided for in many different ways. Generating the attraction/repulsion map may involve utilizing agents having a transmitter for transmitting a signal over a limited range. Neighboring agents can detect the signal and determine the distance and direction to the agent transmitting the received signal. The signal could take many forms, non-limiting examples of which include a directional infrared signal, a laser signal, and a radio signal. On the other hand, rather than utilizing a signal received from another agent, each agent may be equipped with a range-finding system, non-limiting examples of which include an infrared range finding system, an acoustic range finding system, and a low-power radar system. The attraction/repulsion map provides the basis for the attraction and repulsion of agents that are used in order to cause agents to maintain predetermined distances with respect to other agents.

When an agent 606 enters an attraction region of another agent, the agent, that other agent is urged to move toward agent 606. Similarly, when the agent 606 enters the repulsion region of another agent, that other agent is urged to move away from agent 606. When the agent 606 enters the neutral region of another agent, the other agent remains essentially in place. The basis for the motion of the agents generally lies in the formation of a motion vector representing the attraction and repulsion and the application of the motion vector to the means for movement in the agent via the processor.

Figure 7:
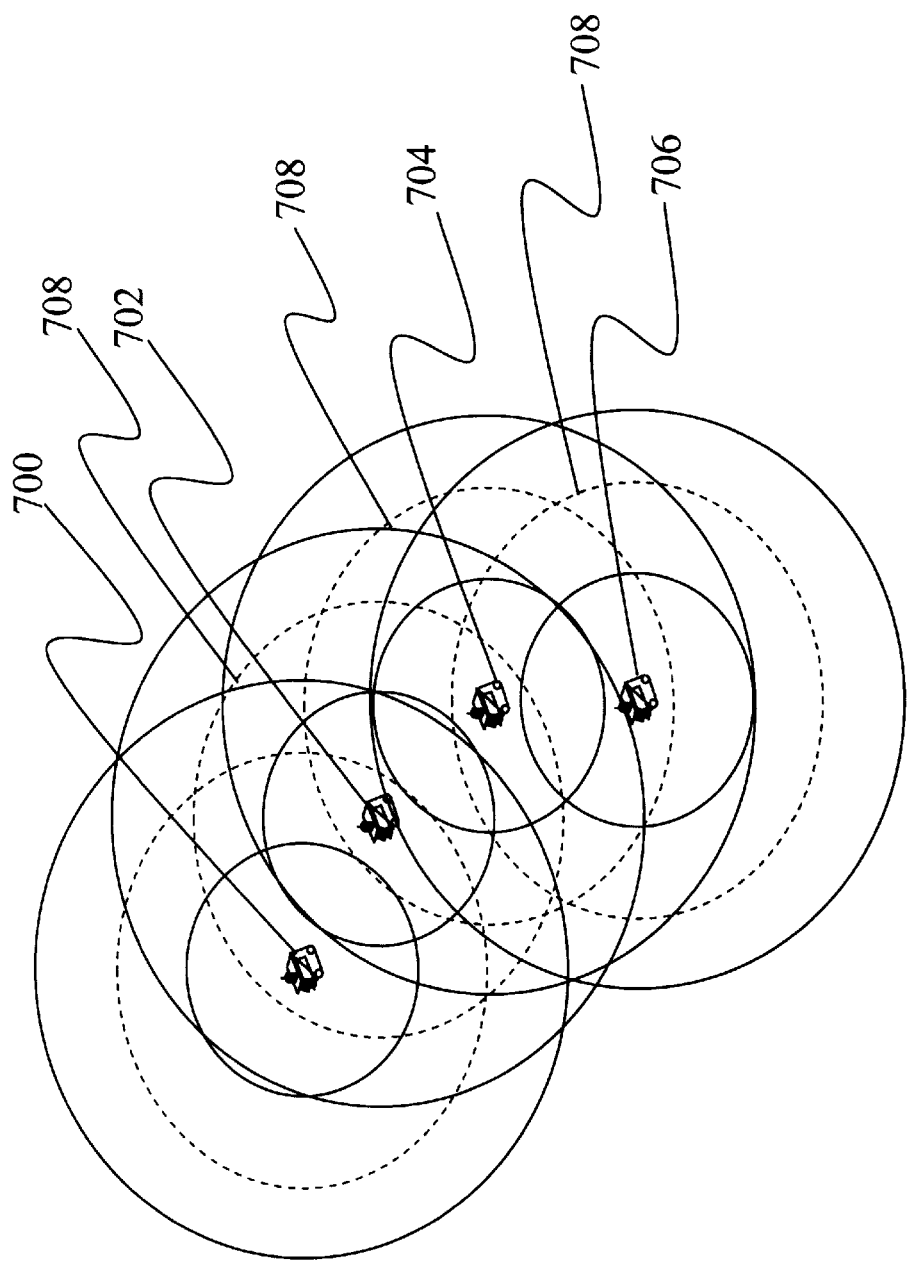
FIG. 7 is an illustrative diagram depicting four agents with attraction/repulsion maps, herein the agents have settled into the neutral regions of each respective attraction/repulsion map and are evenly dispersed.
Figure 8D:
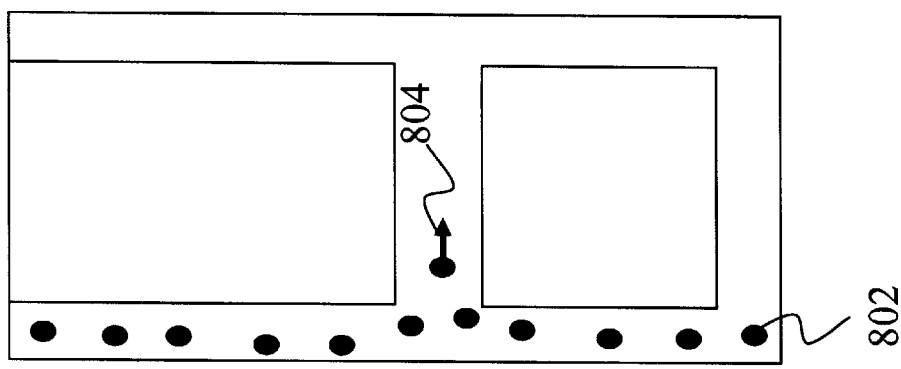
FIG. 8 is an illustrative diagram depicting how a leader acts as a single point of expansion of a group of agents until it hits a dead end, and then another leader takes over as the single point of expansion.
Figure 8C:
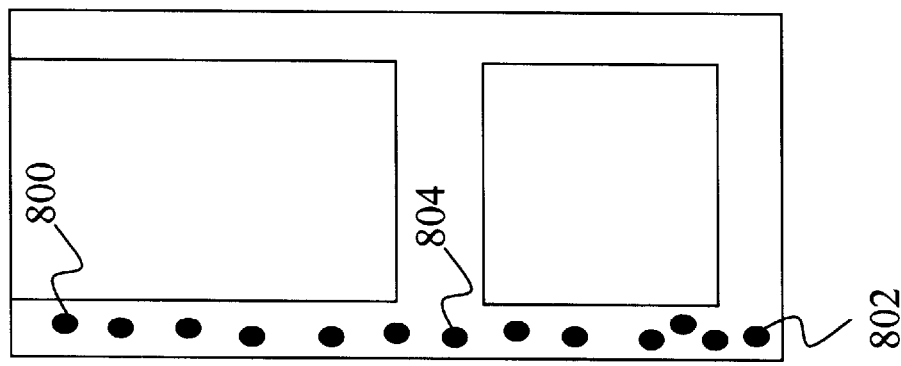
Figure 8B:
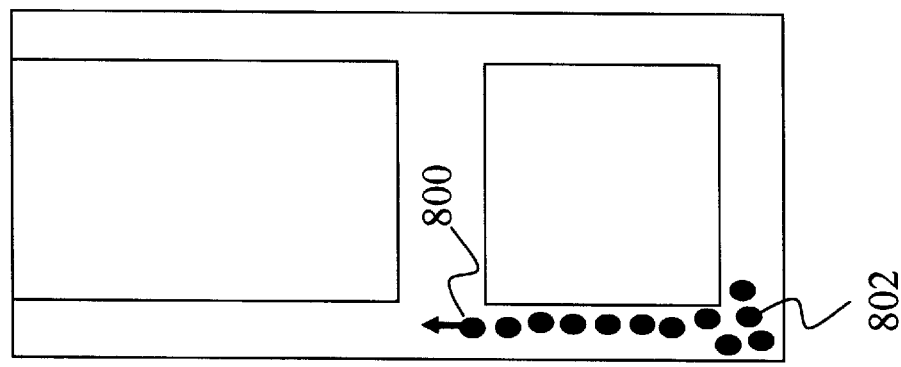
Figure 8A:
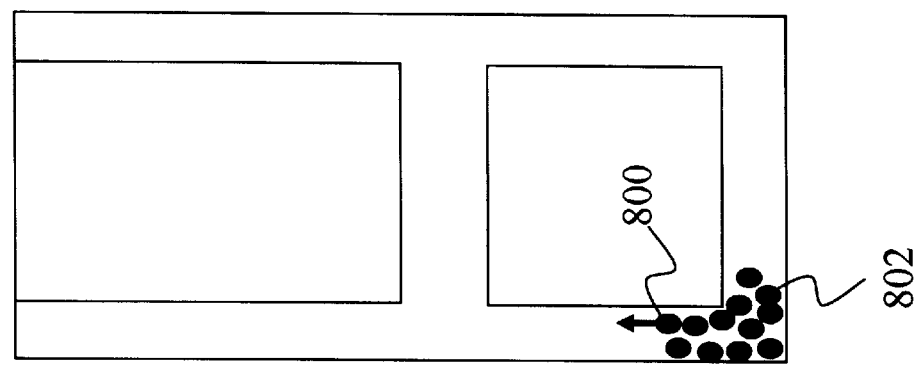

Four agents are shown in FIG. 7, labeled 700, 702, 704, and 706, each including a circular attraction/repulsion map with attraction, repulsion, and neutral regions. For reference, the outer ring of neutral region of each attraction/repulsion map is shown by dotted reference line 708. In FIG. 7, the agents are in a stable condition, each residing within the neutral region of at least one of the other agents, but outside the attraction and repulsion regions of the other agents. The example illustrated in FIG. 7 may be extended to any number of agents, though the illustration of the pattern would become quite complex due to the overlapping depictions of the attraction/repulsion maps. Continuing with reference to FIG. 7, re-designating the neutral region of one of the agents as a repulsion region would force the agent to move away from the other agents, yet the agent would still remain within the attraction region of the other agents. Thus, the other agent would become a leader, the characteristics of which were previously discussed.

The behavior of a group of agents with respect to a leader and the designation of a new leader are shown in FIG. 8. As depicted in FIG. 8*a,* a leader 800 moves away from a group of agents 802. The distance-maintenance movement behavior of the agents used with reference to attraction/repulsion maps causes the agents to spread out as shown in FIG. 8*b.* Because of the increased repulsion from the other agents 802 present in the leader 800, the leader 800 moves away from the other agents 802 and the other agents 802 follow the leader 800. In order to illustrate an event triggering the designation of a new leader 804, FIG. 8*c* shows the agents 802 spread to the point of being blocked by a wall. The blockage of the leader's motion causes the leader 800 to trigger the designation of a new leader 804. In this case, the new leader 804 was selected by determining which agent closed to the current leader 800 has the ability to move away from the other agents 802. The new leader 804 is depicted in FIG. 8*d,* and is able to move to the right through another passageway. This illustrates on method by which a new leader may be chosen. Any relevant criteria may be used to determine which agent to select as a new leader, and the process may be random, criteria determined, or explicitly selected by a person using the set of agents. As mentioned previously, the agents may be equipped with a plurality of other sensors that provide useful information, and the information provided by the sensors on the agents may be used to assist in the determination of a new leader. In FIG. 8, it may be that any agent that senses an open corridor tries to become a leader, and then a single leader is chosen from this subset of agents.

Figure 9:
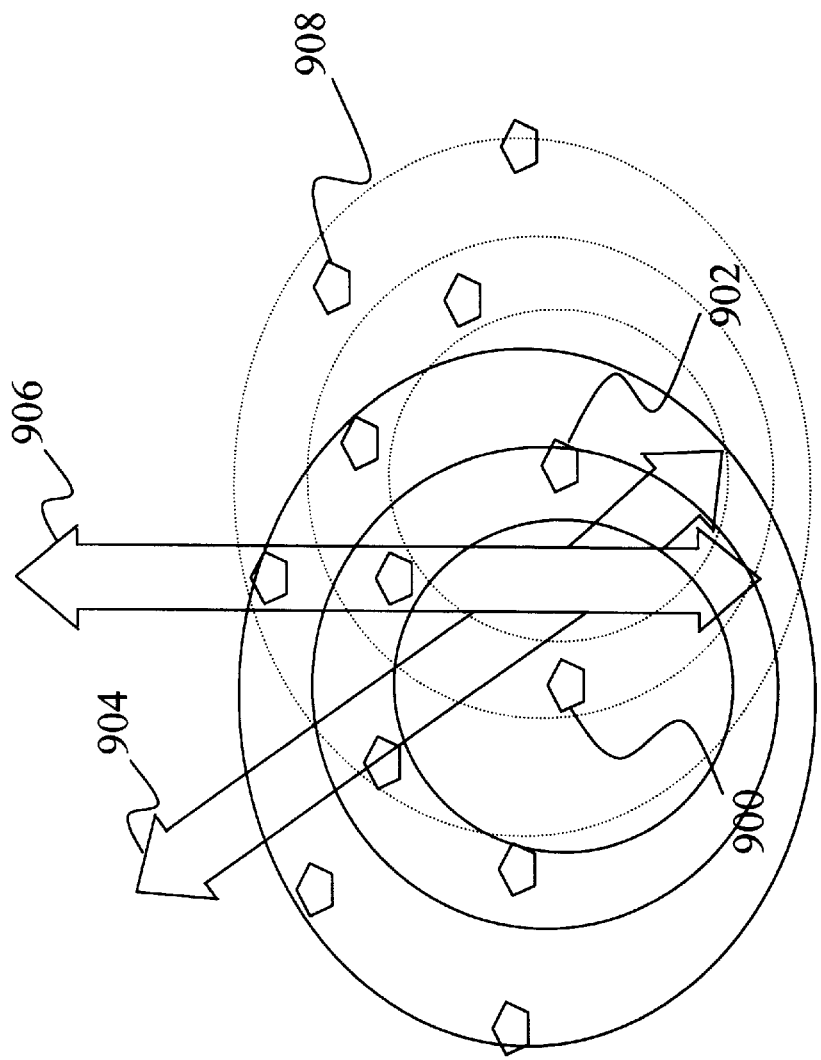
FIG. 9 is an illustrative diagram depicting how two agents each emit a different signal to create an axis of advance.

Movement control of the agents may also take place by selecting reference agents, as depicted in FIG. 9. As shown, agents 900 and 902 may be selected as reference agents. The reference agents transmit signals distinct from the type used for signaling in the distance-maintenance movement behavior, and are preferably different for each reference agent 900 and 902. Two of many possible directions 904 and 906 provided. The signals by the reference agents 900 and 902 are used to align the other agents 908 along the directions. Note that the ability to control agent movement in this manner is a matter of geometry. The relative intensities of the initial signals from the reference agents, along with the distance between the reference agents, determine the angle of alignment that the other agents will assume. Three agents may be used similarly in a method such as triangulation. Further, four agents may be used to define a path in a three dimensional region. Generally, the goal of this method is to propagate message wavefronts from the reference agents. Multiple wavefronts act in a manner similar to beam steering in a phased array antenna, but in this case, the agents calculate their steering vectors based on a comparison of the distance each message has traveled from its source. By varying the signals transmitted from the reference agents, different configurations of the plurality of agents may be achieved.

All logic related to the incorporation of the present invention is typically embodied in the form of software stored in the memory of the agent and operated on by the processor. However, rather than using software, the logic of the present invention may be fixed in hardware as well. In order to provide a more full explanation of the software and its preferred embodiments, a compact disk has been provided as an appendix to this specification, and includes software which performs several of the functions described herein.

What is claimed is:

1. A method for controlling the movement of a plurality of agents wherein each of one of the plurality of agents has at least one other agent locally spaced at a distance therefrom, and wherein each one of the plurality of agents comprises a means for providing mobility, a means for detecting distance and direction to the at least one other locally spaced agent, a processor coupled with the means for providing mobility and the means for detecting distance and direction in order to control the movement of the agent and to process the distances and directions between the agent and the at least one other locally spaced agent, the method comprising the steps of:
   a. determining the distance and direction of each agent from each other agent locally spaced with respect thereto;
   b. processing the distances and directions between the agent and each other locally spaced agent; and
   c. using a distance-maintenance movement behavior based on the distances and directions between the agent and each other locally spaced agent to maintain a predetermined distance from each other locally spaced agent.

2. A method for controlling the movement of a plurality of agents as set forth in claim 1, wherein the method comprises the further steps of:
   i. designating at least one of the plurality of agents to act as a blocking beacon;
   ii. preventing movement of the agent designated to act as a blocking beacon; and
   iii. urging agents locally spaced with respect to the agent designated to act as a blocking beacon to move away from it, whereby the agent designated as a blocking beacon acts to repel other agents from its vicinity.

3. A method for controlling the movement of a plurality of agents as set forth in claim 1, wherein the step of processing the distances between the agent and each other locally spaced agent is performed by:
   i. providing an attraction/repulsion map for each agent, including an attraction region and a repulsion region;
   ii. for each other locally spaced agent, determining, based on the attraction/repulsion map, whether the other locally spaced agent is in the attraction region or the repulsion region with respect to the agent;
   iii. for each other locally spaced agent in the attraction region of the agent, generating a vector representing attraction of the agent toward the locally spaced agent;
   iv. for each other locally spaced agent in the repulsion region of the agent, generating a vector representing the repulsion of the agent from the locally spaced agent;
   v. using all of the vectors developed for all of the locally spaced agents to generate a movement vector; and
   vi. moving the agent according to the movement vector; whereby the movement vector is used provide a heading and velocity for the agent in order to perform the step of using a distance-maintenance movement behavior to maintain a predetermined distance from the agent to each other locally spaced agent.

4. A method for controlling the movement of a plurality of agents as set forth in claim 3, wherein the step of processing the distances between the agent and each other locally spaced agent is further performed by:
   i. further providing a neutral region to the attraction/repulsion map for each agent; and
   ii. for each locally spaced agent, where the agent is in the neutral region of a locally spaced agent, generating a vector representing neutrality toward the locally spaced agent.

5. A method for controlling the movement of a plurality of agents as set forth in claim 4, wherein the step of providing an attraction/repulsion map further comprises the sub-step of configuring the attraction region, the neutral region, and the repulsion region as generally concentric rings around an agent, with the repulsion region residing closest to the agent, the attraction region residing furthest from the agent, and the neutral region residing between the repulsion region and the attraction region, whereby the attraction region and repulsion regions cause movement toward or from an agent and the neutral region causes no movement toward or from an agent, such that the each one of the plurality of agents acts to maintain a predetermined distance from each other agent locally spaced therefrom.

6. A method for controlling the movement of a plurality of agents as set forth in claim 5, wherein the step of providing an attraction/repulsion map further comprises the sub-step of configuring the attraction region with an attraction strength and the repulsion region with a repulsion strength, and wherein the attraction strength and the repulsion strength are functions of the distance from the agent, and wherein the attraction strength is used in generating the vector representing attraction of the agent to the locally spaced agent, and wherein the repulsion strength is used in generating the vector representing repulsion of the agent from the locally spaced agent.

7. A method for controlling the movement of a plurality of agents as set forth in claim 3, wherein the agents are disbursed in an area, and wherein the step of using a distance-maintenance movement behavior further comprises:

a. designating one of the plurality of agents as a leader; and b. adjusting the attraction/repulsion map the leader such that the leader moves further away from the locally spaced agents with the locally spaced agents urged toward the leader, whereby the leader moves away from the other agents and the other agents follow the leader.

8. A method for controlling the movement of a plurality of agents as set forth in claim 7, wherein the leader designating step is triggered when the number of agents provided is insufficient to fill the area while maintaining the predetermined distance from each other.

9. A method for controlling the movement of a plurality of agents as set forth in claim 7, wherein the leader designating step is triggered explicitly by a user command.

10. A method for controlling the movement of a plurality of agents as set forth in claim 7, wherein the specific agent to serve as the leader is determined by a step selected from the group consisting of (a) selecting the leader explicitly by a user command, (b) selecting a leader through a random selection process, (c) selecting a leader through a repeated random selection process, and (d) selecting the leader through a biased random selection.

11. A method for controlling the movement of a plurality of agents as set forth in claim 10, wherein the leader designating step is periodically repeated upon a triggering event to designate a new leader.

12. A method for controlling the movement of a plurality of agents as set forth in claim 11, wherein the leader designating step further includes the sub-step of transmitting, from the leader, a suppression signal for preventing the repetition of the leader designating step until the occurrence of a triggering event.

13. A method for controlling the movement of a plurality of agents as set forth in claim 12, wherein the suppression signal transmitted from the leader is relayed away from the leader such that it indicates the approximate distance from the leader and such that upon cessation of the transmission of the suppression signal, the random selection process is caused to resume, but is biased in favor of those agents furthest from the leader.

14. A method for controlling the movement of a plurality of agents as set forth in claim 12, wherein the suppression signal transmitted from the leader is relayed away from the leader such that it indicates the approximate distance from the leader and is ineffective for preventing the repetition of the leader designating step at a sufficient distance.

15. A method for controlling the movement of a plurality of agents as set forth in claim 3, further comprising the steps of designating at least one agent as a reference agent with each reference agent transmitting a unique reference signal that is relayed through the plurality of agents in such a way as to provide a distance estimate from the respective reference agent, wherein at least a portion of the other agents respond to the at least one reference signal by moving in a manner determined as a function of the distance estimates of the reference signals.

16. A method for controlling the movement of a plurality of agents as set forth in claim 15, wherein in the reference agent designating step, two agents are designated as reference agents, each transmitting a unique reference signal that is relayed through the plurality of agents in such a way as to provide a distance estimate from the respective reference agent, wherein at least a portion of the other agents respond to the at least one reference signal by moving so as to maintain equality between the distance estimates of the two reference signals.

17. A plurality of controlled-movement agents comprising a plurality of agents, each having at least one other agent locally spaced at a distance therefrom, each one of the plurality of agents including a means for providing mobility, a means for detecting distance and direction to the at least one other locally spaced agent, a processor coupled with the means for providing mobility and the means for detecting distance and direction in order to control the movement of the agent and to process the distances and directions between the agent and the at least one other locally spaced agent, and wherein each agent is operative to determine the distance and direction of each other agent locally spaced with respect thereto, to process the distances and directions between the agent and each other locally spaced agent; and to maintain a predetermined distance from each other locally spaced agent.

18. A plurality of controlled-movement agents comprising a plurality of agents as set forth in claim 17, wherein the plurality of agents is further operative to designate one of the plurality of agents to act as a blocking beacon; to prevent movement of the agent designated to act as a blocking beacon; and to urge agents locally spaced with respect to the agent designated to act as a blocking beacon to move away from it, whereby the agent designated as a blocking beacon acts to repel other agents from its vicinity.

19. A plurality of controlled-movement agents comprising a plurality of agents as set forth in claim 17, wherein for the determination of the distances between the agent and each other locally spaced agent, each agent further includes an attraction/repulsion map for each agent, including an attraction region and a repulsion region, where each agent is operative, for each other locally spaced agent, to determine, based on the attraction/repulsion map, whether the agent is in the attraction region or the repulsion region with respect to the other locally spaced agent; for each other locally spaced agent, where the agent is in the attraction region of a locally spaced agent, the agent is operative to generate a vector representing attraction of the agent toward the locally spaced agent; for each other locally spaced agent, where the agent is in the repulsion region, the agent is operative to generate a vector representing the repulsion of the agent from the locally spaced agent; with the agent operative to use all of the vectors developed for all of the locally spaced agents to generate a movement vector; and wherein the movement vector is used provide a heading and velocity for the agent in order to perform the step of using a distance-maintenance movement behavior to maintain a predetermined distance from the agent to each other locally spaced agent, thereby providing a distance maintenance movement behavior.

20. A plurality of controlled-movement agents comprising a plurality of agents as set forth in claim 19, wherein the attraction/repulsion maps for each agent include a neutral region, which each locally spaced agent, where the agent is in the neutral region of a locally spaced agent, results in the generation a vector representing neutrality toward the locally spaced agent.

21. A plurality of controlled-movement agents comprising a plurality of agents as set forth in claim 20, wherein the attraction region, the neutral region, and the repulsion region of the attraction/repulsion map are formed as generally concentric rings around an agent, with the repulsion region residing closest to the agent, the attraction region residing furthest from the agent, and the neutral region residing between the repulsion region and the attraction region, whereby the attraction region and repulsion regions cause movement toward or from an agent and the neutral region causes no movement toward or from an agent, such that the each one of the plurality of agents maintains a predetermined distance from each other agent locally spaced therefrom.

22. A plurality of controlled-movement agents comprising a plurality of agents as set forth in claim 21, wherein in the attraction/repulsion map the attraction region is configured with an attraction strength and the repulsion region is configured with a repulsion strength, and wherein the attraction strength and the repulsion strength are functions of the distance from the agent, and wherein the attraction strength is used to generate the vector representing attraction of the agent to the locally spaced agent, and wherein the repulsion strength is used to generate the vector representing repulsion of the agent from the locally spaced agent.

23. A plurality of controlled-movement agents comprising a plurality of agents as set forth in claim 19, wherein one of the plurality of agents is designated as a leader, and wherein the attraction/repulsion map of the leader is adjusted such that the leader moves further away from the locally spaced agents with the locally spaced agents urged toward the leader, whereby the leader moves away from the other agents and the other agents follow the leader.

24. A plurality of controlled-movement agents comprising a plurality of agents as set forth in claim 23, wherein the designation of the leader is triggered when the number of agents provided is insufficient to fill the area while maintaining the predetermined distance from each other.

25. A plurality of controlled-movement agents comprising a plurality of agents as set forth in claim 23, wherein the designation of the leader is triggered explicitly by a user command.

26. A plurality of controlled-movement agents comprising a plurality of agents as set forth in claim 23, wherein the leader is designated in a manner selected from the group consisting of (a) explicitly by a user command, (b) through a random selection process, (c) through a repeated random selection process, and (d) through a biased random selection.

27. A plurality of controlled-movement agents comprising a plurality of agents as set forth in claim 26, wherein the leader is periodically re-designated upon a triggering event to designate a new leader.

28. A plurality of controlled-movement agents comprising a plurality of agents as set forth in claim 27, wherein the leader transmits a suppression signal for preventing the re-designating of the leader until the occurrence of a triggering event.

29. A plurality of controlled-movement agents comprising a plurality of agents as set forth in claim 28, wherein the suppression signal transmitted from the leader is relayed away from the leader such that it indicates the approximate distance from the leader and such that upon cessation of the transmission of the suppression signal, the random selection process is caused to resume, but is biased in favor of those agents furthest from the leader.

30. A plurality of controlled-movement agents comprising a plurality of agents as set forth in claim 28, wherein the suppression signal transmitted from the leader is relayed away from the leader such that it indicates the approximate distance from the leader and is ineffective for preventing the re-designating of the leader at a sufficient distance.

31. A plurality of controlled-movement agents comprising a plurality of agents as set forth in claim 19, wherein at least one agent is designated as a reference agent with each reference agent transmitting a unique reference signal that is relayed through the plurality of agents in such a way as to provide a distance estimate from the respective reference agent, wherein at least a portion of the other agents respond to the at least one reference signal by moving in a manner determined as a function of the distance estimates of the reference signals.

32. A plurality of controlled-movement agents comprising a plurality of agents as set forth in claim 31, wherein two agents are designated as reference agents, each transmitting a unique reference signal that is relayed through the plurality of agents in such a way as to provide a distance estimate from the respective reference agent, wherein at least a portion of the other agents respond to the at least one reference signal by moving so as to maintain equality between the distance estimates of the two reference signals.

33. A plurality of controlled-movement agents comprising a plurality of agents as set forth in claim 31, wherein two agents are designated as reference agents, each transmitting a unique reference signal that is relayed through the plurality of agents in such a way as to provide a distance estimate from the respective reference agent, wherein at least a portion of the other agents respond to the at least one reference signal by moving so as to maintain equality between the distance estimates of the two reference signals.

34. A plurality of controlled-movement agents comprising a plurality of agents as set forth in claim 19, wherein at least one agent is designated as a reference agent with each reference agent transmitting a unique reference signal that is relayed through the plurality of agents in such a way as to provide a distance estimate from the respective reference agent, wherein at least a portion of the other agents respond to the at least one reference signal by moving in a manner determined as a function of the distance estimates of the reference signals.

35. A controlled-movement agent for use in a plurality of agents including at least one other agent locally spaced at a distance from the controlled-movement agent, the controlled movement agent comprising: a means for providing mobility, a means for detecting distance and direction to the at least one other locally spaced agent, a processor coupled with the means for providing mobility and the means for detecting distance and direction in order to control the movement of the agent and to process the distances and directions between the agent and the at least one other locally spaced agent, and wherein the agent is operative to determine the distance and direction of each other agent locally spaced with respect thereto, to process the distances and directions between the agent and each other locally spaced agent; and to maintain a predetermined distance from each other locally spaced agent.

36. A controlled-movement agent for use in a plurality of agents including at least one other agent locally spaced at a distance from the controlled-movement agent as set forth in claim 35, wherein the agent may be designated as a blocking beacon, wherein the agent ceases movement and urges agents locally spaced to move away from it, whereby the agent designated as a blocking beacon acts to repel other agents from its vicinity.

37. A controlled-movement agent for use in a plurality of agents including at least one other agent locally spaced at a distance from the controlled-movement agent as set forth in claim 35, wherein for the determination of the distances between the agent and each other locally spaced agent, the agent further includes an attraction/repulsion map for each agent, including an attraction region and a repulsion region, where the agent is operative, for each other locally spaced agent, to determine, based on the attraction/repulsion map, whether the agent is in the attraction region or the repulsion region with respect to the other locally spaced agent; for each other locally spaced agent, where the agent is in the attraction region of a locally spaced agent, the agent is operative to generate a vector representing attraction of the agent toward the locally spaced agent; for each other locally spaced agent, where the agent is in the repulsion region, the agent is operative to generate a vector representing the repulsion of the agent from the locally spaced agent; with the agent operative to use all of the vectors developed for all of the locally spaced agents to generate a movement vector; and wherein the movement vector is used provide a heading and velocity for the agent in order to perform the step of using a distance-maintenance movement behavior to maintain a predetermined distance from the agent to each other locally spaced agent, thereby providing a distance maintenance movement behavior.

38. A controlled-movement agent for use in a plurality of agents including at least one other agent locally spaced at a distance from the controlled-movement agent as set forth in claim 37, wherein the attraction/repulsion map for the agent includes a neutral region, which, when the agent is in the neutral region of a locally spaced agent, results in the generation a vector representing neutrality toward the locally spaced agent.

39. A controlled-movement agent for use in a plurality of agents including at least one other agent locally spaced at a distance from the controlled-movement agent as set forth in claim 38, wherein the attraction region, the neutral region, and the repulsion region of the attraction/repulsion map are formed as generally concentric rings around an agent, with the repulsion region residing closest to the agent, the attraction region residing furthest from the agent, and the neutral region residing between the repulsion region and the attraction region, whereby the attraction region and repulsion regions cause movement toward or from an agent and the neutral region causes no movement toward or from an agent, such that the the agent maintains a predetermined distance from each other agent locally spaced therefrom.

40. A controlled-movement agent for use in a plurality of agents including at least one other agent locally spaced at a distance from the controlled-movement agent as set forth in claim 39, wherein in the attraction/repulsion map the attraction region is configured with an attraction strength and the repulsion region is configured with a repulsion strength, and wherein the attraction strength and the repulsion strength are functions of the distance from the agent, and wherein the attraction strength is used to generate the vector representing attraction of the agent to the locally spaced agent, and wherein the repulsion strength is used to generate the vector representing repulsion of the agent from the locally spaced agent.

41. A controlled-movement agent for use in a plurality of agents including at least one other agent locally spaced at a distance from the controlled-movement agent as set forth in claim 37, wherein the agent is disbursed in an area and wherein the agent may be designated as a leader, and wherein the attraction/repulsion map of the leader is adjusted such that the leader moves further away from the locally spaced agents with the locally spaced agents urged toward the leader, whereby the leader moves away from the other agents and the other agents follow the leader.

42. A controlled-movement agent for use in a plurality of agents including at least one other agent locally spaced at a distance from the controlled-movement agent as set forth in claim 41, wherein the designation of the leader is triggered when the number of agents provided is insufficient to fill the area while maintaining the predetermined distance from each other.

43. A controlled-movement agent for use in a plurality of agents including at least one other agent locally spaced at a distance from the controlled-movement agent as set forth in claim 41, wherein the designation of the leader is triggered explicitly by a user command.

44. A controlled-movement agent for use in a plurality of agents including at least one other agent locally spaced at a distance from the controlled-movement agent as set forth in claim 41, wherein the leader is designated in a manner selected from the group consisting of (a) explicitly by a user command, (b) through a random selection process, (c) through a repeated random selection process, and (d) through a biased random selection.

45. A controlled-movement agent for use in a plurality of agents including at least one other agent locally spaced at a distance from the controlled-movement agent as set forth in claim 44, wherein the leader is periodically re-designated upon a triggering event to designate a new leader.

46. controlled-movement agent for use in a plurality of agents including at least one other agent locally spaced at a distance from the controlled-movement agent as set forth in claim 45, wherein the leader transmits a suppression signal for preventing the re-designating of the leader until the occurrence of a triggering event.

47. A controlled-movement agent for use in a plurality of agents including at least one other agent locally spaced at a distance from the controlled-movement agent as set forth in claim 46, wherein the suppression signal transmitted from the leader is relayed away from the leader such that it indicates the approximate distance from the leader and such that upon cessation of the transmission of the suppression signal, the random selection process is caused to resume, but is biased in favor of those agents furthest from the leader.

48. A controlled-movement agent for use in a plurality of agents including at least one other agent locally spaced at a distance from the controlled-movement agent as set forth in claim 46, wherein the suppression signal transmitted from the leader is relayed away from the leader such that it indicates the approximate distance from the leader and is ineffective for preventing the re-designating of the leader at a sufficient distance.

* * * * *